Sept. 6, 1966   R. M. KIMBRO   3,271,057
FASTENING DEVICE
Original Filed Aug. 27, 1962
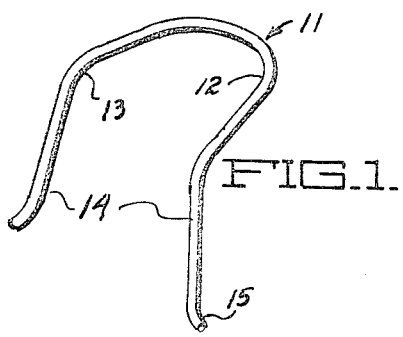
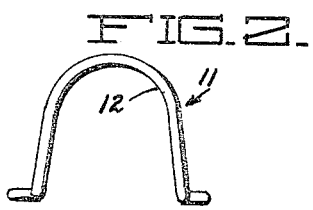
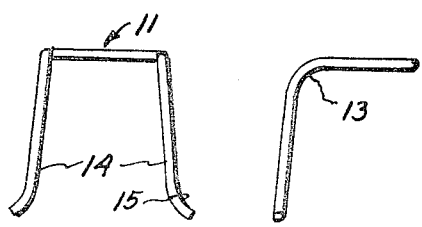
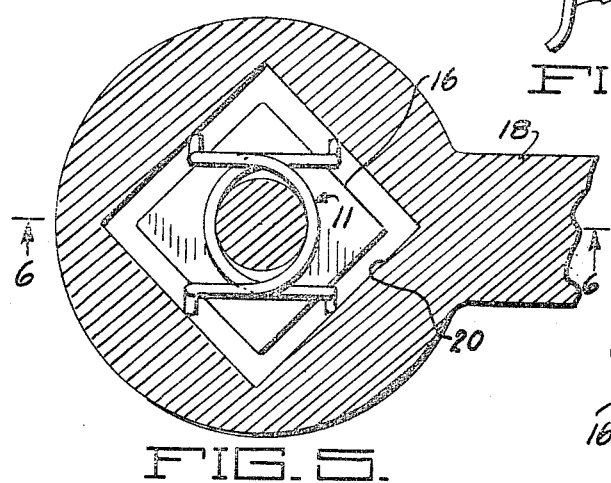
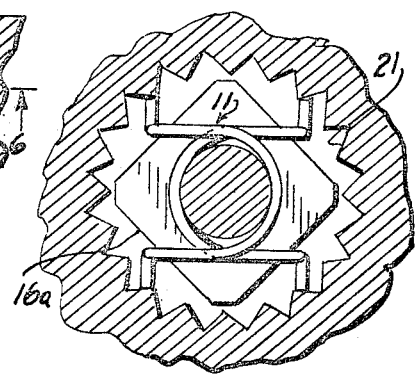
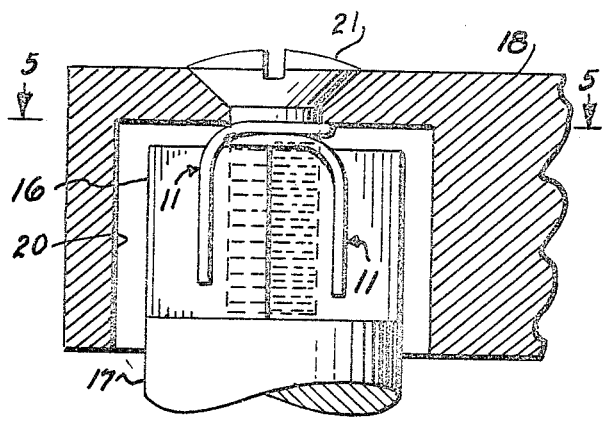
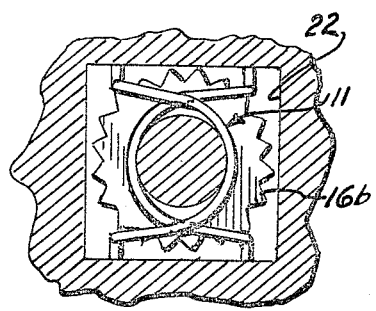
INVENTOR.
ROBERT M. KIMBRO
BY
Fred N. Schwend
ATTORNEY United States Patent Office 3,271,057
Patented Sept. 6, 1966

3,271,057
FASTENING DEVICE
Robert M. Kimbro, South San Gabriel, Calif., assignor to Kimbro Corporation, South San Gabriel, Calif., a corporation of California
Continuation of application Ser. No. 219,603, Aug. 27, 1962. This application July 30, 1964, Ser. No. 387,552
3 Claims. (Cl. 287—53)

This application is a continuation of my application Serial No. 219,603, filed August 27, 1962, and now abandoned.

This invention relates to fastening means and has particular reference to means for fastening a member, such as a handle, to a shaft.

In my copending application, Serial No. 142,237, filed October 2, 1961, I disclosed a rotatable replacement valve stem for water faucets or the like which may be substituted for any of a large number of original valve stems having different sizes and shapes whenever such original stems must be replaced due to wear, etc.

Such replacement valve stems work very satisfactorily. However, it is often desirable in substituting such replacement stems to attach the original handle so that the handle will match other handles or for other reasons. On the other hand, it may be desirable to attach a new handle to an existing valve stem.

Valve stems of the above type have handle receiving sections which are generally either square or cylindrical in cross section, the latter being serrated or fluted to normally receive and fit snugly into mating receiving openings in the valve handles. Such stems or shaft sections may be any of a large number of sizes making it difficult to fit an existing handle to a new valve stem or a new handle to an existing valve stem.

It therefore becomes a principal object of the present invention to attach a member, such as a handle, having a shaft receiving opening to a stem or shaft which does not exactly fit such opening.

Another object is to attach a shaft having a non-cylindrical shaft section to any of a number of members having non-cylindrical shaft receiving openings of different sizes and shapes.

The manner in which the above and other objects of the invention are accomplished will be readily understood on reference to the following specification when read in conjunction with the accompanying drawings, wherein:

FIG. 1 is a perspective view of an adapter clip embodying a preferred form of the present invention.
FIG. 2 is a plan view of the clip.
FIG. 3 is a front view of the clip.
FIG. 4 is a side view of the clip.
FIG. 5 is a sectional plan view through a handle and a valve stem illustrating a pair of adapter clips attached therebetween, such view being taken along line 5—5 of FIG. 6.
FIG. 6 is a sectional view taken along the line 6—6 of FIG. 5.
FIG. 7 is a sectional plan view similar to FIG. 5 but showing a handle with a cylindrical serrated opening coupled to a valve stem having a square section.
FIG. 8 is a sectional plan view similar to FIGS. 5 and 7 but showing a handle having a square opening coupled to a stem having a round serrated shaft portion.

Referring particularly to FIGS. 1 to 4, the adapter clip generally indicated at 11 is formed of spring wire, such as that known in the art as music wire, which is formed intermediate its ends into a loop 12. The ends of the loop extend substantially parallel with each other but actually diverge from each other a slight amount and are then bent through a curve 13 into two legs 14 which extend slightly more than 90° to a plane passing through the loop portion. Actually, the legs extend at approximately 100° to such plane. The legs also diverge outwardly from each other a slight amount and terminate in outwardly curved ends 15.

FIGS. 5 and 6 illustrate two such adapter clips 11 mounted on a square shaft section 16 of the valve stem 17. A handle partly indicated at 18 is provided with a square opening 20 which is shouldered at its upper end and which is somewhat larger than the shaft section 16. A screw 21 is passed through the upper end of the handle and is threaded into the end of the stem 17.

The two clips 11 are mounted one above the other in opposite facing positions on stem portion 16 with the screw 21 extending through the loops 12 of both clips to retain the same in place.

Initially, the clips are fitted over the sides of the shaft portion 16. The handle is then pressed over the legs of the clips, springing them inwardly toward the sides of the shaft portion 16. Accordingly, the ends 15 of the clips engage the sides of the opening 20 and thus effect a driving connection between the handle and the shaft.

As the screw 21 is tightened, the upper portion of the handle will press downward on the loop sections 12 of both clips, as seen in FIG. 6, flexing the latter until such loop sections extend substantially horizontally or at right angles to the legs 14, thereby effecting a driving connection between the handle and the stem. It will also be noted that the curved portions 13 of each clip is pressed firmly against the respective side of the shaft portion 16.

FIG. 7 is a view similar to FIG. 5 but illustrates a handle having a generally cylindrical serrated opening 21 which is attached in driving relation to a stem having a square shaft section 16a by a pair of adapter clips 11.

When the handle is pressed over the clips, the lower curved ends of the clips engage adjacent ones of the serrations, thus forcing the legs firmly against the sides of the square shaft section to establish a driving connection between the handle and the stem.

FIG. 8 illustrates a handle having a square opening 22 which is fitted over a pair of clips 11 on a stem having a generally cylindrical serrated shaft section 16b.

As the handle is pressed over the clips, the legs of the latter are pressed against adjacent serrations in the shaft section 16b, thus establishing a driving connection between the handle and the stem.

In many cases, especially where there is not too great a difference between the size of the handle opening and the shaft section, a single adapter clip 11 is sufficient to establish a driving connection between the handle and the stem. However, more than two clips may be used if necessary to form an adequate driving connection.

The invention obviously may be used in attaching other types of members to shafts or the like, such as gears, pulleys and cranks.

In lieu of the legs 14 being straight as disclosed in FIGS. 1 to 4, they may be curved or formed in a zigzag manner to assist in establishing a driving connection, particularly in cases where the shaft receiving opening in the handle or the like is considerably greater than the shaft section of the stem or shaft.

Having thus described the invention, what I desire to secure by United States Letters Patent is:

1. A device for preventing rotation between a member having a shaft receiving recess with a side wall and a bottom wall and a shaft extending into said recess, wherein said recess is larger than said shaft,
    and means are provided for moving said shaft endwise toward said bottom of said recess, comprising a member of spring wire formed intermediate its ends into a generally U-shaped loop, said loop lying between said bottom of the recess and the adjacent end of said shaft, said loop lying in a plane that extends at least substantially perpendicular to the axis of said shaft and intersects said axis at a point, the ends of said loop being bent to form legs extending along the length of said shaft and between said shaft and the sides of said recess, portions of said legs engaging and binding against the peripheral edge of said end of said shaft upon said movement of said shaft by said moving means, and the terminal portions of said legs extending radially outwardly to drivingly engage the sides of said recess.

2. A device for preventing rotation between a member having a shaft receiving recess with a side wall and a bottom wall and a shaft extending into said recess, wherein said recess is larger than said shaft, and means are provided for moving said shaft endwise toward said bottom of said recess, comprising a member of spring wire formed intermediate its ends into a generally U-shaped loop, said loop lying between said bottom of the recess and the adjacent end of said shaft, said loop lying in a plane that extends at least substantially perpendicular to the axis of said shaft and intersects said axis at a point, the ends of said loop curving into legs, said legs extending along the length of said shaft between said shaft and the sides of said recess, said curving portions of said wire engaging and binding against the peripheral edge of said end of said shaft upon said movement of said shaft by said moving means, and the terminal portions of said legs extending radially outwardly to drivingly engage the sides of said recess.

3. A device for preventing rotation between a member having a shaft receiving recess with a side wall and a bottom wall and a shaft extending into said recess, wherein said recess is larger than said shaft, and means are provided for moving said shaft endwise toward said bottom of said recess, comprising a member of spring wire formed intermediate its ends into a generally U-shaped loop, said loop lying between said bottom of the recess end and the adjacent end of said shaft, said loop lying in a plane that extends at least substantially perpendicular to the axis of said shaft and intersects said axis at a point, the ends of said loop curving into legs, said legs extending along the length of said shaft between said shaft and the sides of said recess, said curving portions of said wire drivingly engaging the peripheral edge of said end of said shaft upon said movement of said shaft, and the terminal portions of said legs curving radially outwardly to drivingly engage the sides of said recess.

References Cited by the Examiner

UNITED STATES PATENTS

| | | |
|---|---|---|
| 1,208,839 | 12/1916 | Salfisberg. |
| 1,389,477 | 8/1921 | Beeman _____ 292—353 X |
| 1,909,353 | 5/1933 | Hughes et al. |
| 2,271,266 | 1/1942 | Kost. |
| 2,593,609 | 4/1952 | Rhodes. |
| 2,634,992 | 4/1953 | Nelson. |
| 3,026,742 | 3/1962 | Bruno. |

CARL W. TOMLIN, *Primary Examiner.*

A. V. KUNDRAT, *Assistant Examiner.*